(12) United States Patent
Amir et al.

(10) Patent No.: US 8,907,764 B1
(45) Date of Patent: *Dec. 9, 2014

(54) METHODS AND SYSTEMS FOR SYNCHRONIZED ULTRASONIC REAL TIME LOCATION

(71) Applicant: Centrak, Inc., Newtown, PA (US)

(72) Inventors: Israel Amir, Princeton, NJ (US); Karuppiah Annamalai, Yardley, PA (US)

(73) Assignee: Centrak, Inc., Newtown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/079,805

(22) Filed: Nov. 14, 2013

Related U.S. Application Data

(60) Continuation of application No. 12/986,519, filed on Jan. 7, 2011, now Pat. No. 8,604,909, which is a division of application No. 12/016,547, filed on Jan. 18, 2008, now Pat. No. 8,139,945.

(60) Provisional application No. 60/881,269, filed on Jan. 20, 2007.

(51) Int. Cl.
   *G08B 5/22* (2006.01)
   *G08B 25/00* (2006.01)
   *G01S 5/22* (2006.01)

(52) U.S. Cl.
   CPC ........................................ *G01S 5/22* (2013.01)
   USPC .... 340/8.1; 340/10.1; 340/539.11; 455/456.1

(58) Field of Classification Search
   USPC ............ 340/8.1, 10.1, 539.11, 7.2; 455/456.1
   See application file for complete search history.

(56) References Cited

U.S. PATENT DOCUMENTS

| | | | |
|---|---|---|---|
| 4,955,000 A | | 9/1990 | Nastrom |
| 5,689,229 A | | 11/1997 | Chaco et al. |
| 5,917,425 A | * | 6/1999 | Crimmins et al. ............. 340/8.1 |
| 6,141,293 A | | 10/2000 | Amorai-Moriya |

(Continued)

OTHER PUBLICATIONS

Office Action for U.S. Appl. No. 12/016,547, mailed Sep. 9, 2011.

(Continued)

*Primary Examiner* — Eric M Blount
(74) *Attorney, Agent, or Firm* — RatnerPrestia

(57) ABSTRACT

Methods and systems for determining a location and an identity of a portable device are provided. The system includes apparatus for transmitting timing synchronization information, a plurality of stationary ultrasonic base stations and a plurality of portable devices. Each ultrasonic base station is configured to receive the timing synchronization information and to transmit a corresponding ultrasonic location code in a time period based on the received timing synchronization information. Each portable device is configured to: 1) receive the timing synchronization information, 2) detect the ultrasonic location codes from the ultrasonic base stations and 3) transmit an output signal including a portable device ID representative of the portable device and the detected ultrasonic location code. Each portable device is synchronized to detect the ultrasonic location code in the time period based on the received timing synchronization information.

13 Claims, 11 Drawing Sheets

(56) References Cited

U.S. PATENT DOCUMENTS

| | | | |
|---|---|---|---|
| 6,946,956 | B2 | 9/2005 | Hayashi et al. |
| 6,958,677 | B1 | 10/2005 | Carter |
| 6,970,097 | B2 | 11/2005 | Welles et al. |
| 7,307,522 | B2 | 12/2007 | Dawson |
| 7,764,574 | B2 * | 7/2010 | Lee .............................. 367/128 |
| 8,018,584 | B1 | 9/2011 | Amir |
| 8,139,945 | B1 | 3/2012 | Amir |
| 8,190,730 | B2 | 5/2012 | Dempsey |
| 2001/0011954 | A1 | 8/2001 | Shelton et al. |
| 2006/0077759 | A1 * | 4/2006 | Holm .............................. 367/128 |
| 2007/0063833 | A1 | 3/2007 | Kates |
| 2007/0152833 | A1 | 7/2007 | Kaplan et al. |
| 2007/0184852 | A1 | 8/2007 | Johnson et al. |
| 2008/0147461 | A1 | 6/2008 | Lee et al. |

OTHER PUBLICATIONS

Cox et al., "Time Synchronization for Zigbee Networks," Proceedings of the 37$^{th}$ IEEE Southeastern Symposium on System Theory (SST'050, Mar. 2005, pp. 135-138, Tuskegee, AL.

Office Action dated Jan. 24, 2011, U.S. Appl. No. 12/016,547.

Non Final Office Action for U.S. Appl. No. 13/423,662, filed Mar. 19, 2012, dated Jun. 27, 2014.

Marco et al., "Location-based services for elderly and disabled people", Science Direct Computer Communication 31, 2008.

David L. Mills, "Internet Time Synchronization: The Network Time Protocol", IEEE Transactions on Communications, vol. 39, No. 10, Oct. 1991.

Petition for Inter Partes Review of U.S. Patent No. 8,604,909 Under 35 U.S.C. §312 and 37 C.F.R. 42.104, dated Jul. 30, 2014.

Declaration of Robert Kline-Schoder, Ph.D. regarding U.S. Patent No. 8,604,909, dated Jul. 30, 2014.

* cited by examiner

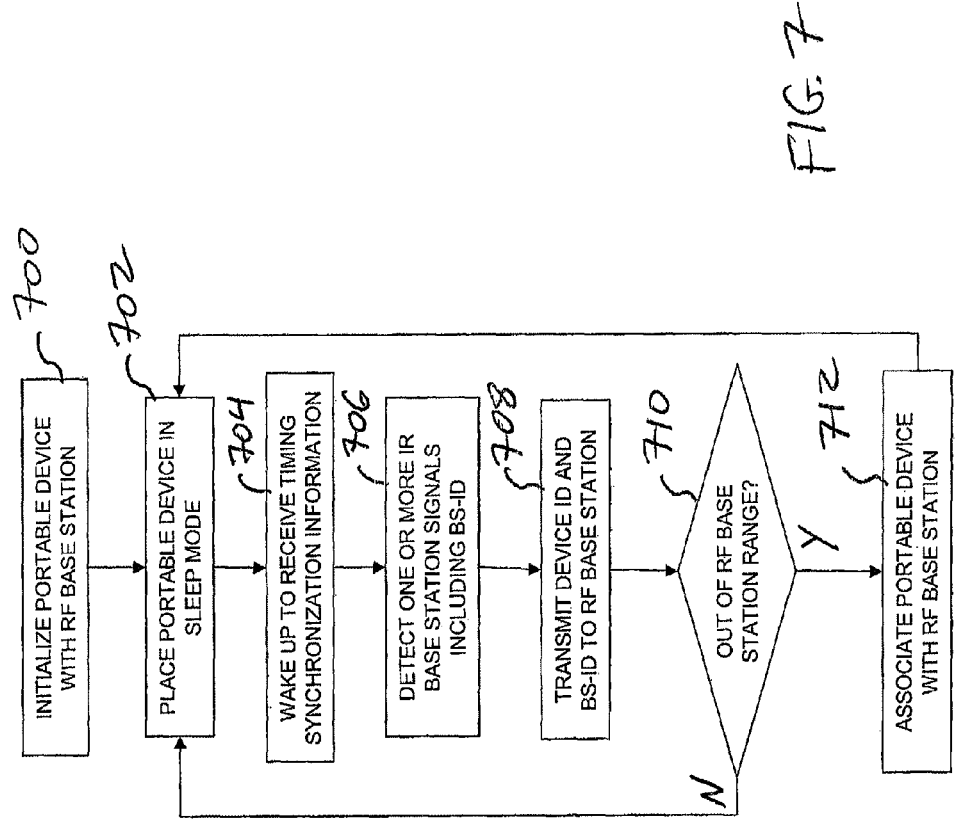

ly synchronization

METHODS AND SYSTEMS FOR SYNCHRONIZED ULTRASONIC REAL TIME LOCATION

CROSS REFERENCE TO RELATED APPLICATIONS

This patent application is a continuation application of U.S. patent application Ser. No. 12/986,519, filed Jan. 7, 2011, which claims the benefit of priority from U.S. patent application Ser. No. 12/016,547, filed Jan. 18, 2008 and U.S. Provisional patent application No. 60/881,269, Filed Jan. 20, 2007. The contents of which are incorporated herein by reference.

FIELD OF THE INVENTION

The present invention relates real-time location systems. In particular, the present invention relates to methods and systems for locating and identifying portable devices in an enclosure.

BACKGROUND OF THE INVENTION

Real-time location (RTL) systems have become popular in recent years. Conventional RTL systems typically use radio frequency (RF) transmission to determine location. The RF based methods typically do not provide enough accuracy to support room and sub-room level accuracies. A few systems utilize infrared (IR) transmission as a localization method. The conventional "IR method" typically employs an IR transmitter on a portable device (i.e. a tag) and IR receivers in base stations that are scattered in rooms and corridors within the enclosure. A portable device ID is typically received by one of IR the base stations and the location of the portable device is determined based on its vicinity to a base station. A tag based IR transmitter typically needs a line of sight between the transmitter and a receiver (i.e. a base station) in order to robustly detect the device ID. This type of RTL system, thus, is occasionally prone to a lack of reception by the receiver base stations when the line of sight is blocked, making it susceptible to reliability problems. Also, these types of IR base stations are presently wired both for power and connectivity because they use IR receivers that are "open" at all times. The need for wiring increases the installation complexity and cost.

There is also another type of IR system that employs IR transmitters at the base stations and IR receivers at the portable device which attempts to solve the problem of poor IR sensitivity, by transmitting substantially higher power levels than wired stationary base stations are typically capable of. This system may address the sensitivity problem but does not address the wired installation problem. Furthermore, in order to make sure that the IR signal is readily available to the portable device at all times, the IR base stations transmit the IR signals at a very high burst repetition rate. The first installations of such systems generally failed because of an unexpected problem; the IR base stations interfered with TV remote controls that are a part of is almost all patient rooms in hospitals. To solve the problem, newer systems transmit the IR signals much less often, with a severe penalty on tag power consumption (because the tag needs to search for the IR signal with an open IR receiver).

SUMMARY OF THE INVENTION

The present invention relates to systems and methods for locating and identifying portable devices in an enclosure. The system includes means for transmitting timing synchronization information, a plurality of stationary infrared (IR) base stations and a plurality of portable devices. Each IR base station is configured to receive the timing synchronization information and to transmit a corresponding IR location code in a time period based on the received timing synchronization information. Each portable device is configured to 1) receive the timing synchronization information, 2) detect the IR location codes from the IR base stations and 3) transmit an output signal including a portable device ID representative of the portable device and the detected IR location code. Each portable device is synchronized to detect the IR location code in the time period based on the received timing synchronization information.

BRIEF DESCRIPTION OF THE DRAWINGS

The invention may be understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 7 is a flow chart illustrating a method for determining the location and identity of a portable device, according to an embodiment of the present invention;

DETAILED DESCRIPTION OF THE INVENTION

Figure 1:
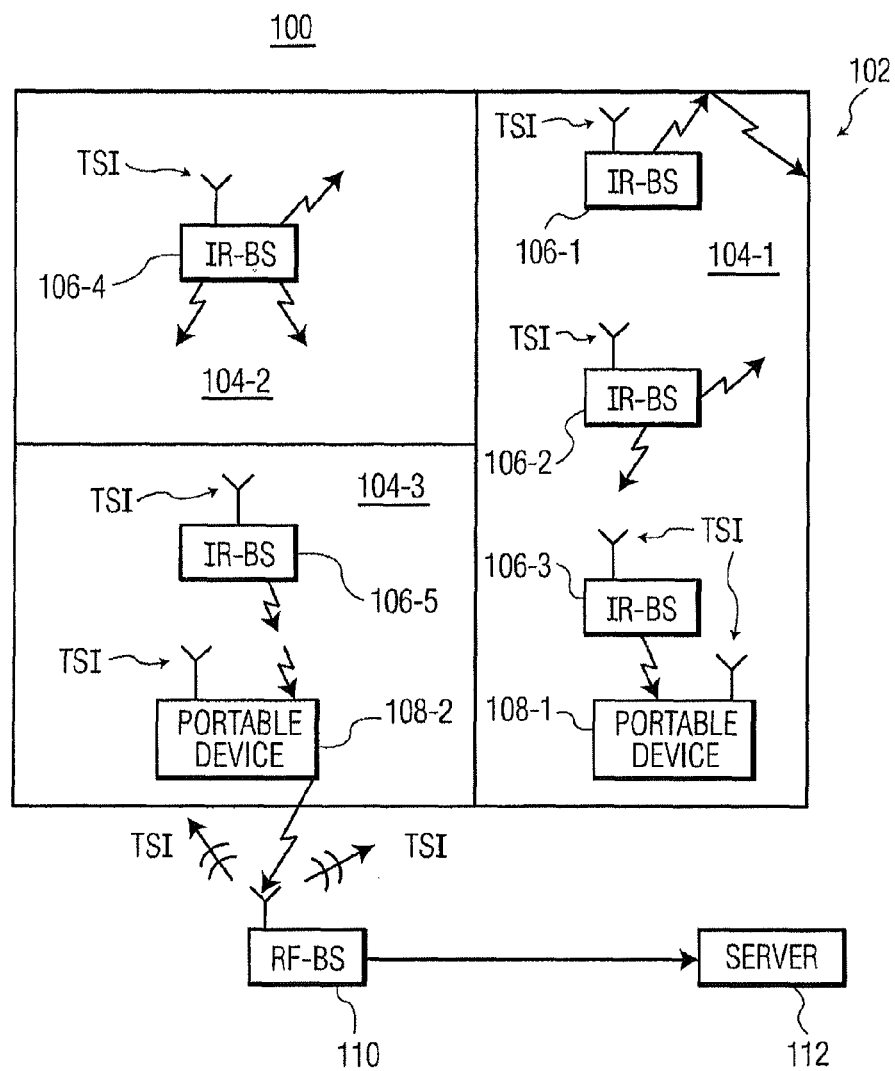
FIG. 1 is a block diagram of a system for locating and identifying portable devices in an enclosure, according to an embodiment of the present invention.

RTL systems are known that include base stations that transmit IR signals (i.e., IR base stations) with their respective base station ID (BS-ID) to portable devices that are equipped with IR receivers. Upon reception of a BS-ID, the portable device transmits both the device ID and the received BS-ID to a reception device, for example, by radio frequency (RF) or IR transmission. The RTL system may include a server that associates the BS-ID with the device ID (received from the portable device by the reception device). In this manner, the position of the portable device may be displayed as the position of the IR base station. In typical implementations, base stations are connected to a power supply whereas the portable device is typically is powered by a coin cell battery, a much higher transmitted power may be achieved by using a base station for IR transmission, as compared to portable device (tag) for IR transmission. As a result the reliability of the reception is improved.

The IR base station typically transmits a BS-ID (as well as other information) continually or almost continually and, thus, may not operate via battery power. Accordingly, the portable device has no indication of when the transmissions by the IR base stations occur and may receive the IR signals anytime (or almost anytime).

Because the base stations may not operate by battery power, typically one of two approaches is used for RTL systems with IR transmitter type base stations. In the first approach, power may be routed from an existing A/C outlet to a desired location for the IR base station operation. In the second approach, the base station may be connected directly to an outlet.

The first approach may be costly as compared to the typical cost of a base station. In a typical installation, routing power (or power over Ethernet) can amount to costs of greater than five times the cost of the base station itself. In the second method, the routing installation costs may be mitigated, but, the direct connection to the outlet typically compromises the system performance. For example, most power outlets are installed at the bottom of walls. In the position near the outlets, base stations may be susceptible to being blocked by objects and they typically cover twice a range that a ceiling mounted base station covers (for example, if the base station is installed in the middle of a room).

In addition, IR base stations typically do not coexist in a same physical open space because "dead zones" may be generated where the IR signals from the two base stations overlap and because the IR transmissions from the base stations are typically unsynchronized. If the base station uses a short random duty cycle for transmission, the portable devices may operate in a receiving state for a much longer period, thus resulting in a substantially reduced battery lifetime. Synchronizing the portable device to the transmission rate of the IR base station is generally not desirable. For example, in many cases, the portable device is outside of the range of an IR base station (such as in corridors) that is to say, in an area typically not covered by the RTL system. In such cases, the portable device typically activates the IR is receiver for longer periods of time, waiting for a possible IR transmission from the IR base station.

The present invention relates to systems and methods for detecting and locating portable devices in an enclosure. According to one aspect of the present invention, the exemplary system includes a RF base station that may periodically transmit a beacon. The beacon may be received by both the IR base stations and the portable devices (i.e. nodes of the system). In an exemplary embodiment, the beacon includes timing synchronization information (TSI) that may provide a unified time of origin to all nodes in the system. After a predefined period of time from the unified time of origin, the IR base stations may transmit their corresponding BS-IDs. The portable device may open communication to receive the BS-ID after the same predetermined period of time from the unified time of origin. The portable device may then transmit its associated ID and the received BS-ID to the RF base station. By synchronizing the IR base stations and the portable devices to a unified time of origin, the portable device may be in a sleep mode when it is not in a state of transmission or reception. Accordingly, a battery power consumption by the portable device may be reduced.

According to another aspect of the present invention, the exemplary system may include a plurality of RF base stations (also acting as nodes in the system), where the RF base stations act as synchronizing base stations other RF base stations. Each RF base station may periodically transmit a beacon to associated IR base stations, other RF base stations and any associated portable devices. The transmission from the portable device may be received by the synchronizing base stations or by the other RF base stations. The RF base stations may provide the device ID and the associated BS-ID to a central computer. The information may then be displayed or processed by other client applications.

Referring now to FIG. 1, a block diagram is shown of a system 100 for determining a location and an identity of portable devices 108 in an enclosure 102. System 100 may include a plurality of IR base stations (IR-BS's) 106, one or more portable devices 108 and at least one RF base station (RF-BS) 110.

RF base station 110 may transmit timing synchronization information (TSI), for example, in a beacon, to IR base stations 106 and portable devices 108 that are each equipped with RF transceivers, by RF transmission. The TSI may be used by IR base stations 106 to transmit a corresponding BS-ID, i.e. an IR location code, in a period of time after receiving the TSI. The TSI may be used by portable devices 108 to open a reception channel in the period of time corresponding to the transmission time of the IR base stations 106. The period of time for IR base stations 106 to transmit the respective BS-ID signals may be fixed or transmitted as a part of the information carried by the beacon.

Enclosure 102 may include a plurality of separate zones 104, which typically coincide with individual rooms or zones within enclosure 102. For example, zone 104-1 represents a corridor. Each room or zone may be provided with at least one IR base station 106. For example, corridor 104-1 includes IR base stations 106-1, 106-2, 106-3.

The IR base stations 106 may be mounted from a ceiling or on walls of rooms 104 or mounted at an AC receptacle (not shown). The IR base stations 106 may be battery powered or may be activated from an available power source, described further below with respect to FIG. 3. Even if an IR base station 106 is positioned at a lower room level, such as near an AC receptacle, and an obstruction is located nearby, IR communication may still be possible due to IR reflections from a ceiling or a wall of the room 104.

IR base station 106 typically transmits very short bursts of IR location signals from an IR transmitter (i.e. corresponding BS-IDs) at periodic intervals based on the TSI received from RF-BS 110. Each IR base station 106 may transmit a unique BS-ID signal that may be identified at a central control as originating from a particular zone or room 104. The BS-ID may, for example, be transmitted at an IR carrier frequency that is typically around 40 kHz that is resilient to avoid signal interference from fluorescent lamps and may be in the form of bursts of the order of about 3 milliseconds long. It is understood that any suitable frequency and duration of the IR burst may be used. Although IR base station 106 is described as including an IR transmitter, it is contemplated that IR base station 106 may also include an IR receiver.

Portable devices 108 may be provided for persons or apparatuses. The portable devices 108 may include an IR receiver and an RF transceiver (FIG. 4) which are coupled to each other. In this manner, the RF transceiver may receive the TSI and may transmit received BS-ID and its device ID at an RF carrier frequency to RF base station 110.

The modulated carrier signal received by RF base station 110 may be decoded to reproduce the BS-ID and the device ID, for example, by a decoding network (not shown), by server 112 or by RF base station 110. The BS-ID and the device ID may be used by server 112 to determine where a particular person or device is located.

Although IR base stations 106 are described, it is contemplated that the base stations 106 may also be configured to transmit a corresponding BS-ID by an ultrasonic signal, such that base stations 106 may represent ultrasonic base stations. Accordingly, portable devices 108 may be configured to include an ultrasonic receiver to receive the BS-ID from an ultrasonic base station.

Figure 2:
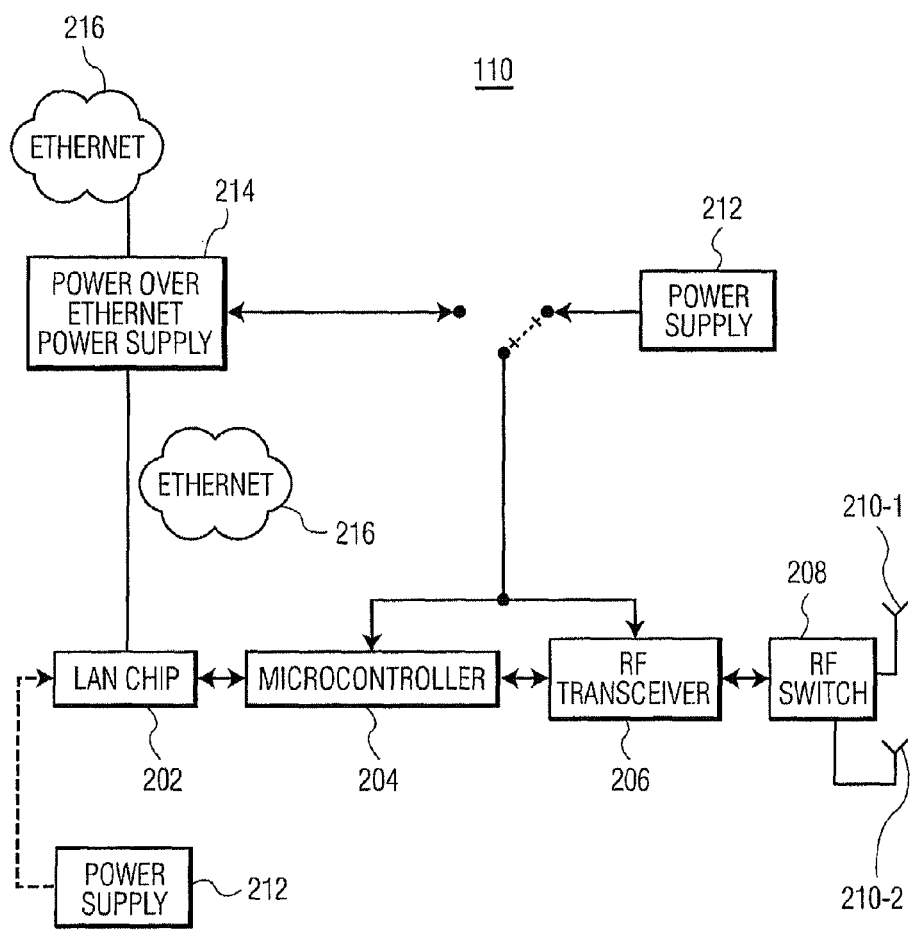
FIG. 2 is a block diagram of a radio frequency (RF) base station, according to an embodiment of the present invention.

Referring now to FIG. 2, a block diagram of RF base station 110 is shown. RF base station 110 may include local area network (LAN) chip 202, microcontroller 204, RF transceiver 206, RF switch 208 and antennas 210-1, 210-2. RF base station 110 may be powered by an external power supply 212 or by an Ethernet power supply (POE) 214 that is also used to power LAN chip 202. LAN chip 202 may also be powered by external power supply 212. LAN chip 202 may be used to allow multiple RF base stations 110 to communicate with each other over a network such as Ethernet 216. For example, as described further below, multiple RF base stations 110 may transmit a timing signal to each other via Ethernet 216 in order to synchronize the RF base stations 110.

RF transceiver 206 may be configured to receive RF transmissions, for example, from portable device 108 (FIG. 1) or from another RF base station 110, from antenna 210. RF transceiver 206 may also be configured to transmit the TSI, such as by transmitting an RF beacon that includes the TSI, via antenna 210. In an exemplary embodiment, antennas 210-1, 210-2 may be conventional diversity antennas used for both transmission and reception alternately.

Microcontroller 204 may be configured to control LAN chip 202, and RF transceiver 206, as well as RF switch 208, for example, to transmit the TSI, communicate with other RF base stations and receive RF transmissions from portable devices 108 (FIG. 1). It is contemplated that RF base station 110 may be configured to receive RF transmissions from IR base stations 106 that include a portable device ID and an associated BS-ID. RF base station 110 may also be configured to connect to server 112 (FIG. 1) by Ethernet 216.

Figure 3:
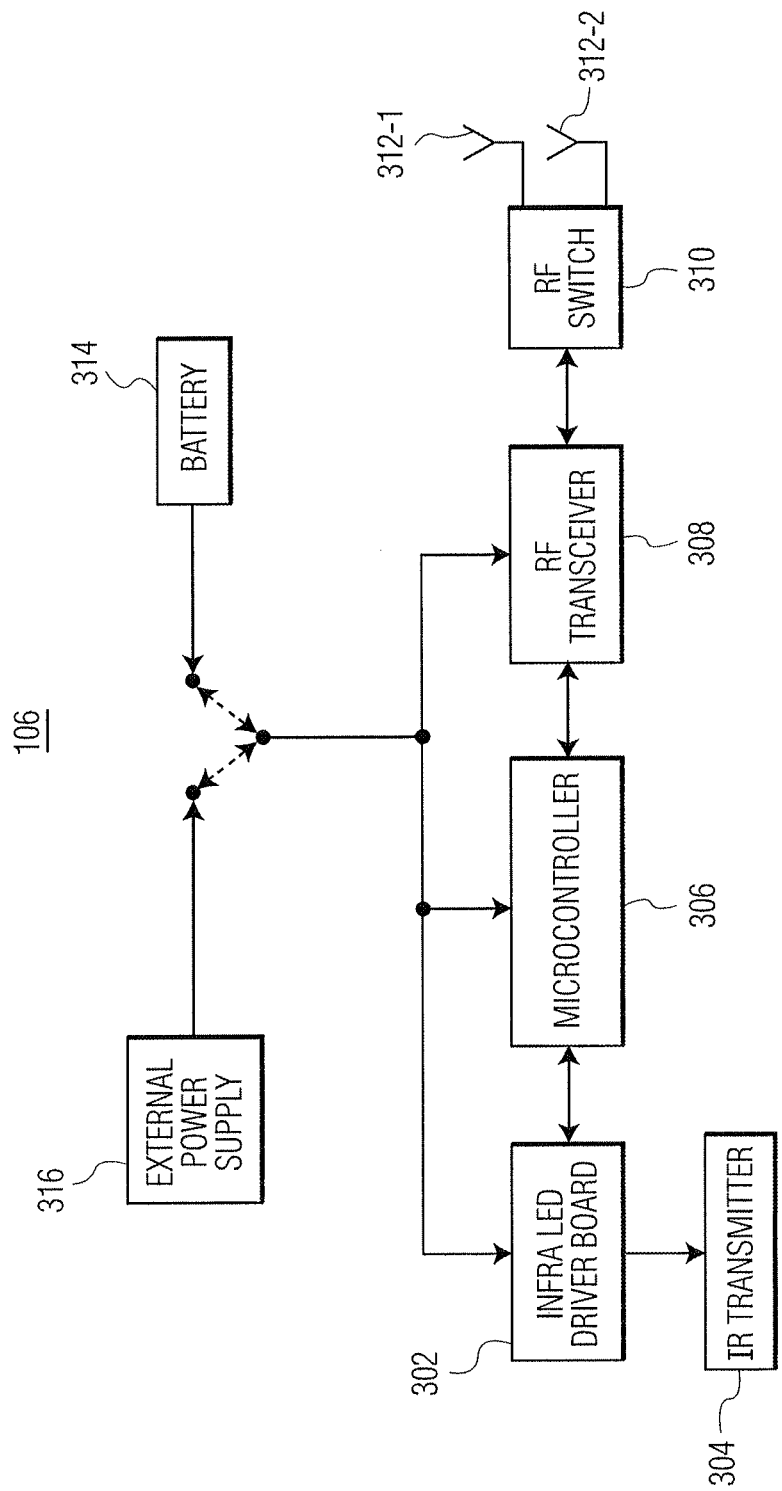
FIG. 3 is a block diagram of an infrared (IR) base station, according to an embodiment of the present invention.

Referring now to FIG. 3, a block diagram of IR base station 106 is shown. IR base station includes RF transceiver 308, RF switch 310, antennas 312-1, 312-2, microcontroller 306, IR LED driver board 302 and IR transmitter 304. IR base station 106 may be powered by battery 314 or by an external power supply 316. Synchronized IR base stations 106 may provide for a simple and low cost installation and allow for a coexistence of IR base stations 106 without dead regions (typically caused by an overlap in coverage).

RF transceiver 308 may be configured to receive RF transmissions, for example, beacons including the TSI from RF base station 110 (FIG. 1) via antenna 312-1 or 312-2. Antenna 312-1 or antenna 312-2 may be selected by RF switch 310 and that may be controlled by microcontroller 306. For example, microcontroller 306 may determine that antenna 312-2 receives a stronger beacon signal as compared to antenna 312-1 and may control RF switch 310 to select antenna 312-2 for RF reception.

Although not shown in FIG. 3, a BS-ID associated with IR base station 106 may be stored by IR base station 106, for example, in a memory of microcontroller 306. Driver board 302 may be configured to transmit the associated BS-ID to IR transmitter 304. Although in an exemplary embodiment, 64 LEDs are used as IR transmitter 304, it is understood that IR transmitter may include any device suitable for transmitting an IR burst that includes the associated BS-ID.

Microcontroller 204 may be configured to control driver board 302, and RF transceiver 308, as well as RF switch 310. Based on the TSI received by RF transceiver 308, microcontroller 204 may control driver board 302 to transmit the BS-ID at a period of time, T1, after the TSI is received. For example, referring to FIG. 8A, a beacon 802 including the TSI may be received. After a period T1, IR transmitter 304 (FIG. 3) may be controlled to transmit an IR signal 804 including the BS-ID. After a period T2, another beacon 802 may again be received by IR base station 106 (FIG. 3). Although IR transmission 804 is illustrated as occurring once every period T2, it is contemplated that an IR base station transmission 804 may be activated multiple times in time period T2.

Referring back to FIGS. 1 and 3, by synchronizing all of the nodes (i.e. the RF base station 110, IR base stations 106 and portable devices 108), IR base stations 106 may be powered by battery 314. Because portable devices 108 are battery powered, if the nodes of system 100 were not synchronized, the IR transmitter 304 would transmit IR signals more often (increasing its power consumption) so that portable device 108 would reduce an amount of time detecting the IR signals (to decrease its power consumption). IR detection may be power consuming and long detection periods may quickly deplete the battery of the portable device 108.

According to an exemplary embodiment, IR base station 106 may include a timer, for example, as part of microcontroller 306. The timer may be used by microcontroller 306 to begin IR transmission. IR base station 106 may periodically adjust the timer by communicating a request to RF base station 110 (FIG. 1) a time delay to a next beacon transmission time or the next IR transmission time.

IR base station 106 may transmit a request to RF base station 110 (FIG. 1) via RF transceiver 308 for a time delay to a next beacon transmission time or the next IR transmission time. The RF base station 110 (FIG. 1) may reply to IR base station 106 with an RF transmission that includes the time delay. IR base station 106 may then activate RF transceiver 308 to receive the beacon at the received time delay and may adjust the timer according to the received beacon.

In addition, RF transceiver 308 permits IR base station 106 to transmit an RF signal including information about the status of the transmitter of IR base station 106 to RF base station 110. For example, a battery status of IR base station 106 may be transmitted. If no RF transmissions are received from IR base station 106, server 112 may determine that the particular IR base station 106 is inoperable.

Figure 4:
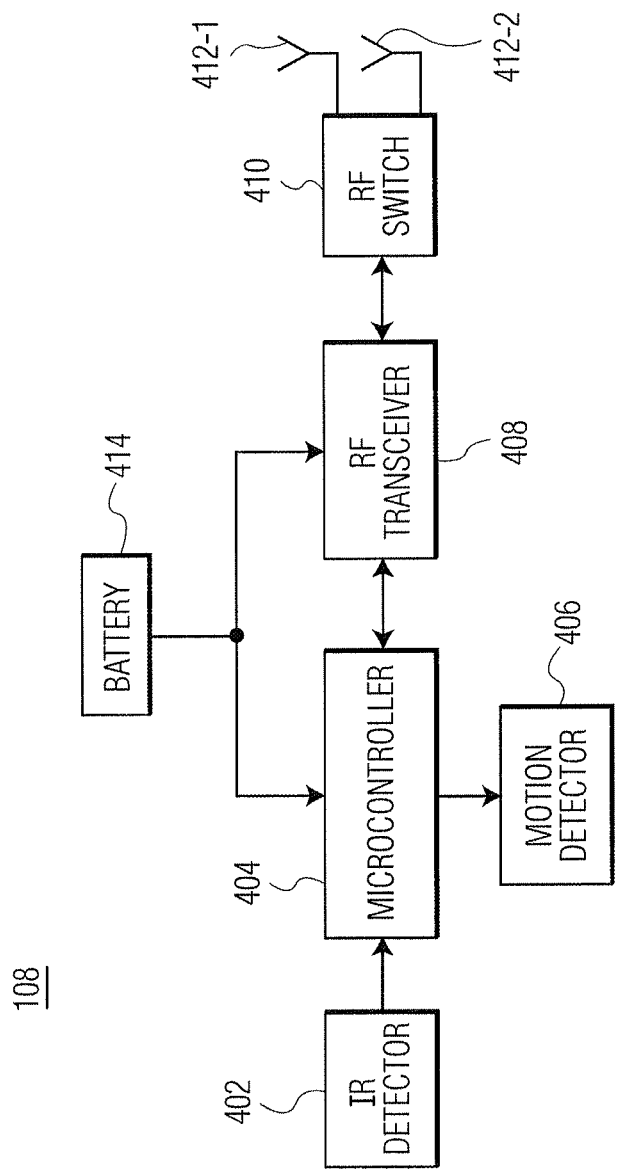
FIG. 4 is a block diagram of a portable device, according to an embodiment of the present invention.

Referring now to FIG. 4, a block diagram of portable device 108 is shown. Portable device 108 includes IR detector 402, microcontroller 404, motion detector 406, RF transceiver 408, RF switch 410 and antennas 412-1, 412-2. Portable device 108 is powered by battery 414. Microcontroller 404 may control motion detector 406 to determine whether portable device 108 is stationary or in transit. It is contemplated that motion of portable device 108 may be communicated to RF base station 110 (FIG. 1), for example, to determine whether portable device 108 may be moving out of the enclosure 102. More importantly, when motion detector 406 is not active the portable device 108 may stay asleep as long as there is no motion. The system 100 would know the location of portable device 108 the last time portable device 108 was located based on its last transmission. Also, portable device 108 can transmit a communication to the system that it is in a no-motion state and is about to go to sleep. In practice, sleeping portable devices 108 may communicate with the system once in about 5 minutes to let the system know that they are alive. In addition, IR base stations 106 may also be placed in a sleep mode. For example IR base stations 106 in locations such as doctors' offices may be placed in sleep mode during hours where the office is closed.

IR detector 402 may be configured to receive IR transmissions, for example, IR signals including associated BS-IDs, from IR base stations 106 (FIG. 1). IR detector 402 may detect IR signals from a number of IR base stations 106 (FIG. 1). Microcontroller 404 may be configured to select a stronger one of the IR signals received from different IR base stations 106. Microcontroller 404 may store the BS-ID, for example in a memory of microcontroller 404 (not shown).

RF transceiver 408 may be configured to receive RF transmissions, for example, beacons including the TSI from RF base station 110 (FIG. 1) via antenna 412-1 or 412-2. Antenna 412-1 or antenna 412-2 may be selected by RF switch 410 that may be controlled by microcontroller 404. For example, microcontroller 404 may determine that antenna 412-2 receives a stronger beacon signal as compared to antenna 412-1 and may control RF switch 410 to select antenna 412-2 for RF reception. RF transceiver 408 may also be configured to transmit RF signals to RF base station 110 (FIG. 1) via antenna 412-1 or 412-2, for example, RF signals including the device ID associated with portable device 108 and a BS-ID received from IR detector 402.

Microcontroller 404 may be configured to control IR detector 402, and RF transceiver 408, as well as RF switch 410. Based on the TSI received by RF transceiver 408, microcontroller 404 may control IR detector 402 to begin IR detection the BS-ID after a period of time, T1, that is after the TSI is received. For example, referring to FIG. 8B, a beacon 802 including the TSI may be received by RF transceiver 408 (FIG. 4). After period T1, IR detector 402 (FIG. 4) may be controlled to begin receiving an IR signal 806 including the BS-ID. Microcontroller 404 may then control RF transceiver 408 (FIG. 4) to transmit an RF signal 808 including the associated device ID and the received BS-ID. After a period T2, another beacon 802 may again be received by portable device 108 (FIG. 4).

Referring back to FIG. 4, because portable device 108 includes RF transceiver 408, a device capacity may be increased. If a portable device employs only a transmitter, it typically repeats its transmission several times, in order to increase the probability that the signal will be received by RF base station 110. One reason that transmissions do not get received may be collisions with other transmissions by other portable devices. RFID systems do not typically use time division multiple access (TDMA) as it limits the number of portable devices the system can handle. Accordingly, the transmissions are typically performed in a random fashion. Such systems can generally support many tens of thousands of portable devices. 1-D systems (transmitter only) typically transmit each transmission several times to increase the probability that the signal went through (typically up to 6 times).

In general, RF base station 110 (FIG. 1) may embed commands to portable device 108 in an RF transmission. For example, RF base station 110 (FIG. 1) may not receive the RF signal due to collisions with other portable devices 108 that may be transmitting RF signals at the same time and/or due to signal fading, for example due to enclosure 102 (FIG. 1). In an exemplary embodiment, portable device 108 may receive an acknowledgement (ACK) transmission packet from RF base station 110 (FIG. 1) that the RF signal transmitted by portable device 108 is received and would not need to re-transmit the RF signal. If portable device 108 does not include an RF receiver, portable device 108 may instead repeatedly transmit the device ID and BS-ID, i.e. the location information, without verification that location information was correctly received by RF base station 110 (FIG. 1). In exemplary system 100 of the present invention, a 2-D system (that uses a transceiver) is provided. The combination of a 2D system and synchronization allows the use of time slots instead of completely random timing, which almost triples the capacity of the portable device 108.

According to an exemplary embodiment, portable device 108 may include a timer, for example, as part of microcontroller 404. The timer may be used by microcontroller 404 to begin IR detection. Portable device 108 may periodically adjust the timer by communicating a request to RF base station 110 (FIG. 1) a time delay to a next beacon transmission time or a time delay to IR base station 106 (FIG. 1) transmission time. Although a timer is described with respect to portable device 108, each IR base station 106 may also include a timer to begin IR transmission.

Portable device 108 may transmit a request to RF base station 110 (FIG. 1) via RF transceiver 408 for a time delay to a next beacon transmission time. The RF base station 110 (FIG. 1) may reply to portable device 108 with an RF transmission that includes the time delay to the next beacon transmission time. Portable device 108 may then activate RF transceiver 408 to receive the beacon at the received time delay and may adjust the timer according to the received beacon.

Alternatively, portable device 108 may transmit a request to RF base station 110 (FIG. 1) via RF transceiver 408 for a time delay to an IR base station 106 transmission time. The RF base station 110 (FIG. 1) may reply to portable device 108 with the time delay to the next transmission. Portable device 108 may then activate IR detector 402 to receive the IR transmission from IR base station 106 (FIG. 1) and may adjust the timer according to the received IR transmission. It is contemplated that portable device 108 may adjust the timer regularly based on each received IR transmission or periodically. Although methods for timer adjustment are described with respect to portable device 108, similar methods for timer adjustment may also be applied to each IR base station 106.

Figure 5:
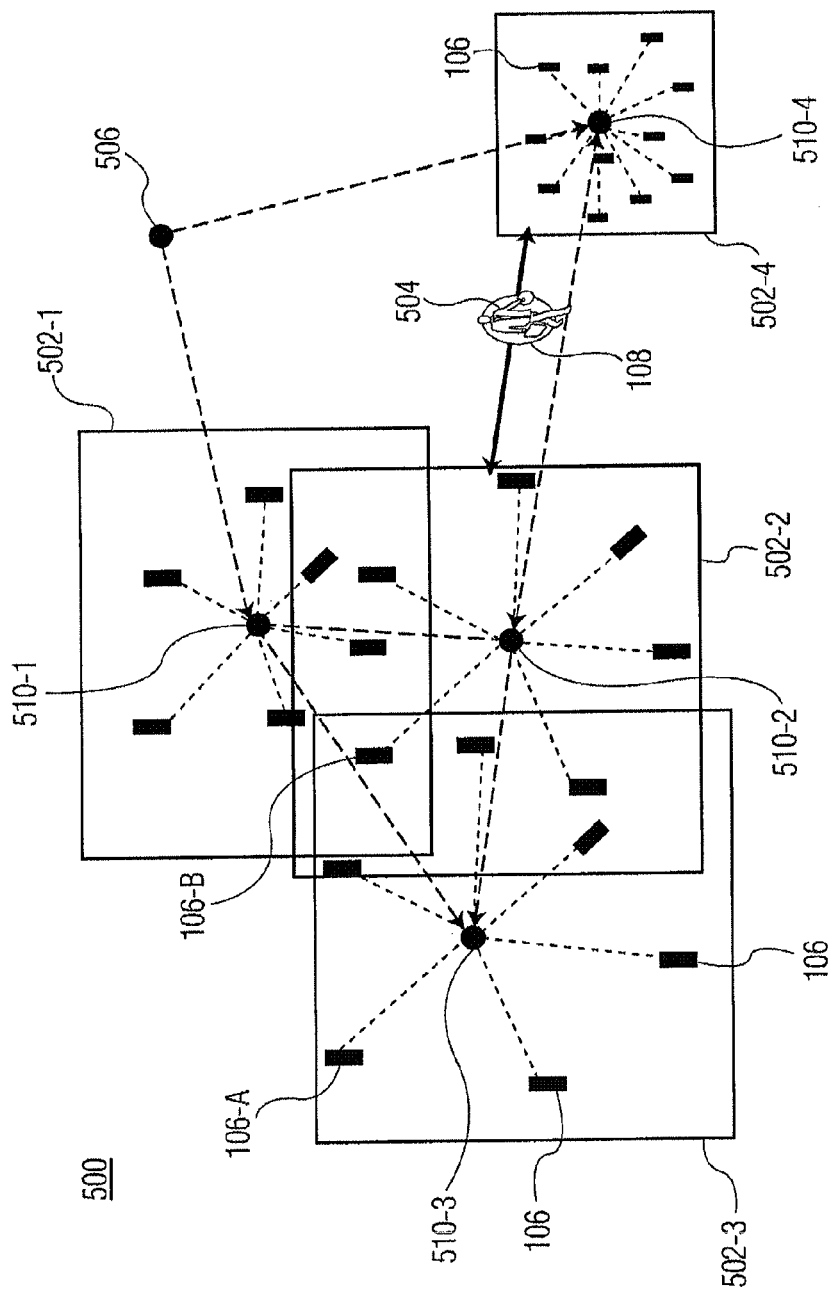
FIG. 5 is a block diagram of a system for locating and identifying portable devices using multiple subnets, according to another embodiment of the present invention.
Figure 6A:
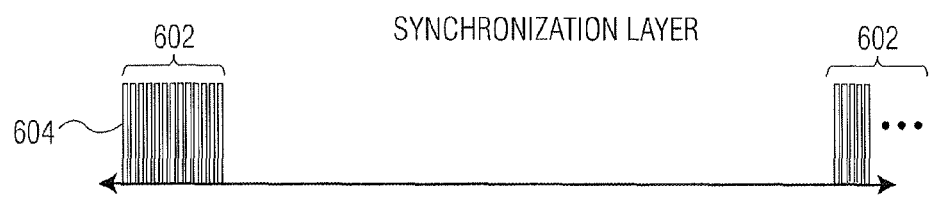
FIGS. 6A and 6B are graphs of various transmissions in synchronization and communication layers of the system shown in FIG. 5 as a function of time, according to an embodiment of the present invention.
Figure 6B:
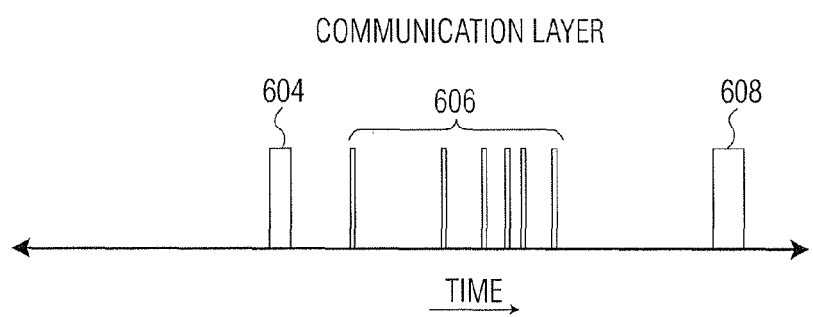

Referring now to FIGS. 5, 6A and 6B, a system 500 for locating and identifying portable devices 108 is shown, according to another embodiment of the present invention. FIG. 5 is a block diagram of system 500 for locating and identifying portable devices using multiple subnets 502; and FIGS. 6A and 6B are graphs of various transmissions in synchronization and communication layers of system 500 as a function of time.

Referring to FIG. 5, system 500 includes central server 506 that may be connected to multiple RF base stations 510 using a backbone network, for example, a LAN. System 500 may include multiple subnets 502, with an RF base station 510 associated with a respective subnet 502. IR base stations 106 may be associated with one or more subnets 502. For example, IR base station 106-A is associated with subnet 502-3 whereas IR base station 106-B is associated with subnets 502-1, 502-2 and 502-3. Portable device 108 on person 504 may stay within one subnet 502 or move among subnets 502, for example from subnet 502-2 to subnet 502-4.

Individual clocks on the different nodes (i.e. RF base stations 510, IR base stations 106 and portable device 108) may be slightly different from each other. As time passes the individual clocks may drift. A synchronization signal may be used to maintain all of the nodes close enough to a common time of origin to allow to system to operate efficiently. As described above, an increase in power consumption may occur if synchronization is not used. In order to synchronize all nodes to the common time of origin, periodic synchronization signals may be transmitted by the individual RF base stations 510. According to one embodiment, RF base stations 510 may be synchronized by a wired connection, such as a LAN. For example, the system can be synchronized by a wireless LAN, such as a WiFi network, as a backbone LAN. Although in an exemplary embodiment the wireless LAN operates according to the Institute of Electrical and Electronics Engineers (IEEE) 802.11 protocol, it is understood that any suitable wireless LAN may be used. Synchronization by a LAN may not provide enough accuracy because the LAN may have an unknown delay, based on the system load and the technology used. According to another embodiment, the synchronization signals may be propagated by dedicated wireless signals sent by RF base stations 510.

According to one embodiment of the present invention, the RF base stations 510 may relay the time synchronization to other base stations that are scattered around the facility. One of RF base stations 510 may be designated as a master base station, for example RF base station 510-1, and the time of origin is defined through the beacon transmission of the master base station. All of the remaining RF base stations 510 (for example, 510-2, 510,3 and 510-4) that receive the master base station beacon, transmit respective beacons in predefined time slots, described further below with respect to FIG. 6. For example, each of the remaining RF base stations 510 may transmit a respective beacon in relatively quick succession.

For example, if 10 RF base stations 510 are provided around a facility and each beacon duration is about 5 milliseconds with a basic interval between beacons of about 10 milliseconds, the entire period for the beacons is about 150 milliseconds. A general period of system 500 may be between about 3 seconds and 45 seconds. Each beacon may transmit other information, such as an offset time to the time of origin. Accordingly, any portable device 108 or any IR base station 510 that receives the beacon information may determine how to time the respective transmission or reception relative to the time of origin, regardless of what beacon they are tuned to. In this manner, portable device 108 and IR base stations 106 may lock onto different beacons. If portable device 108 or IR base stations 510, in contrast, do not lock onto an absolute time of origin, portable device 108 or IR base stations 510 may not transmit and receive information at the same time.

For example, one RF base station (STAR) 510, for example 510-1, may be designated as a master and assigned an ID=1. A second STAR 510-2 that is in communication range with the master base station may be assigned an ID=2. A third STAR that is in a communication range of ID=1 and/or ID=2 may be assigned ID=3.

Master beacon 510-1 (a master transceiver) may originate a beacon that includes the originating transceiver ID (for the time of origin). RF base station 510-2 with ID=2 (a second transceiver) may receive the master beacon transmission and may originate a second beacon that includes the second transceiver ID and the offset from the time the master beacon was received. RF base station 510-3 with ID=3 (a third transceiver) may receive a beacon transmission from any RF base station 510 with a lower ID and may originate a third beacon that includes the third transceiver and the total time offset from the master beacon. According to another embodiment, the second transceiver with ID=2 may issue a request for timing synchronization from the master transceiver and the master transceiver may transmit the timing information as a reply. Any transceiver with an ID greater than ID=2 may issue a request for timing synchronization from another transceiver with an ID less than that of the requesting transceiver. The requested RF transceiver may then reply with the timing synchronization information. It is contemplated that other suitable methods, for example, methods employed by mesh networks, may also be used to propagate the timing information. One example of mesh networks is described in an article to Cox et al., entitled "Time Synchronization for ZigBee Networks," in *Proceedings of the 37th IEEE Southeastern Symposium on System Theory*, Tuskegee, Ala., March 2005, pp. 135-138, the contents of which are incorporated herein by reference.

According to another embodiment of the present invention, in order to accommodate regions that are disconnected (for example, tracking in a different building represented by subnet 502-4), a new synchronizing beacon subnet may be initiated. To initiate subnet 502-4, a new master base station beacon generator may be started. This is similar to having a new system with a new master RF base station to cover a new region that is disconnected. This situation may occur when there are two different areas that are physically disconnected, such as two buildings. If there is Ethernet synchronization, then there may be only one network, because all nodes can be synchronized through the Ethernet regardless of the physical distance. Ethernet synchronization, however, is not as accurate and, depending upon the circumstances, may require larger batteries to compensate for the extra power consumption. The new subnet 502-4 may have a new timing, unless there are supplementary synchronizing signals between the subnets, such as physical wiring or other delay controlled signaling system is available.

According to another embodiment of the present invention, portable device 108 may send a request to any RF base station 510 in communication range for a new beacon location when portable device 108 leaves one subnet 502, for example 502-2, and as a result loses the associated subnet beacon. All RF base stations 510 that receive the request may communicate the information with server 506. Server 506 then determines which RF base station 510 may respond and become the new RF base station associated with portable device 108. For example, RF base station 502-4 may be selected. The selected RF base station 510-4 may respond to portable device 108 with the associated beacon timing information (for example, a length of time from the current response to the next beacon) or the time to the next IR transmission. It is contemplated that portable device 106 may continue to assume that it is locked onto a particular RF base station 510 even after losing the associated beacon. In this manner, an efficient transition to a new subnet 510 during roaming may be provided. Generally, a clock accuracy for portable device 108 may be sufficient for a few minutes, to allow the portable device 108 to acquire a new beacon while still functioning as synchronized IR receiver.

Referring to FIGS. 6A and 6B, transmissions in synchronization and communication layers of system 500 are shown as a function of time. In general, the synchronization layer shown in FIG. 6A may be used for beacon transmission whereas the communication layer shown in FIG. 6B may be used for all other needs. In the synchronization layer, transmissions may be regularly sent. In the communication layer, transmissions are randomly accessed. The synchronization and communication layers may include different frequency channels.

In the synchronization layer, synchronization beacons 602 may be is transmitted. It is known that two adjacent RF base stations 510 typically may not transmit their respective beacons at the same time because dead zones may be produced in the area of overlap. Accordingly, beacons 602 may be transmitted in different time slots. For example, 15 time slots may be allocated to beacons 602. If there are more RF base stations 510, time slots may be reused. In an exemplary embodiment, a 250 ms distance is provided between beacons 602.

In the communication layer, after beacons 602 are transmitted, an IR time slot 604 for IR transmission from IR base stations 106 is accessed. Portable device 108 to RF base stations 510 communications 606 are then executed. Following time slots 606, an RF base station 510 to server 506 communication 608 is then executed.

Referring back to FIG. 5, three different exemplary methods are next described for synchronization of the RF base stations. In the first method, beacons from RF base stations 510 are periodically transmitted. In the second method, RF base stations 510 may receive timing information from other RF base stations 510 by actively requesting synchronization. RF base stations 510 are typically connected among each other and to server 506 via an Ethernet backbone network. In the third method, the timing signal is transmitted on the backbone network.

According to the first exemplary method, the synchronization information may propagate through system 500 using beacons. Beacons may be periodic transmissions originating from a master RF base station, for example RF base station 510-1. The master base station may periodically transmit, for example, every 30 seconds, a transmission that defines the time of origin. The remaining RF base stations 510 that receive the beacon transmit their own associated beacon (in a different offset time), adding the respective time offset from the time of origin to the associated beacon transmission. As described above, time slots may be dedicated to beacon transmissions and the time slots may be recycled, in order to limit an amount of time in the cycle dedicated to beacon transmissions. For example, 15 time slots may be dedicated for beacon transmissions, so that RF base stations 510 which are within a common reception range may not transmit beacons at the same time. The beacons may be transmitted on a dedicated frequency such that there is little or no interference among the beacon transmission and with the communications of portable is device 108 and IR base stations 106. According to the first method, by using beacons, a channel capacity may be improved. For example, IR base stations 106 do not have to crowd the air space with requests for timing information. The first method also allows broadcasting of information to all portable devices 108 simultaneously and does not use a wired network among RF base stations 506.

According to the second exemplary method, RF base stations 510 may receive timing information from another upstream RF base station 510 (i.e. a base station with a lower assigned ID number) by actively requesting synchronization information from the upstream RF base station 510. According, RF base stations 510 actively request the timing information instead of passively listening to periodic beacons. The selection of an RF base station 510 to provide the timing information may be determined as follows. When system 500 is initialized, RF base stations 510 may transmit a broadcast message including a request of association. All upstream RF base stations 510 that receive the request may transmit back, in a random time from the time of receiving the request, a reply to the requesting RF base station 510 that includes the RSSI of the broadcasted request. The requesting RF base station may then determine which RF base station 510 it may be associated with based on the received RSSI values. Alternatively, other methods, such as methods for mesh networks may be utilized.

The following section relates to Ethernet synchronization rather than for RF synchronization, where the response is always substantially immediate and where, if the signal is not received immediately, the reception window closes. According to an embodiment of the present invention, the synchronization may be valid if a time delay between the originating request by the RF base station 510 and the received timing information is below a threshold. According to the second method, a power consumption by portable device and the IR BS 108 may be higher because with the first method the nodes need only listen to beacons and not have a request/response session. Using the first method (of beacons) also facilitates broadcasting by the RF base stations.

According to the third exemplary method, the synchronization timing signals among the RF base stations may be transmitted on the backbone network. RF base stations 510 may periodically request a synchronization time stamp from server 506 (or from a dedicated time server). In case the network is temporarily loaded, RF is base stations 510 may repeat the request a few seconds later to ensure that the round trip time (from the request to the receipt of information) is below a system threshold, for example 30 milliseconds, to ensure accurate synchronization.

Synchronization according to the third method does not use a line of sight between RF base stations 510 and is simple to implement. This method may reduce a number of RF base stations 510 needed but it may increase power consumption by portable device 108 because the synchronization accuracy using a network may be reduced (as compared to the first and second methods).

Portable device 108 and IR base stations 106 may be associated with one or more RF base stations 510. According to an exemplary embodiment, portable device 108 (or an IR base station 106) may send a request for association to one or more RF base stations 510 that are within transmission range of portable device 108 (or IR base station 106). All RF base stations 510 that receive the request may transmit the information to central server 506 with the RSSI values of the request. Server 510 may select an RF base station 510 to be associated with portable device 108 (or IR base station 106). The association for the IR base stations 106 may be determined upon an initialization of system 500 because IR base stations 106 are stationary. For portable device 108, however, the association process may be repeated as portable device 108 roams among subnets 502 and the associated RF base station 510 changes.

Referring now to FIG. 7, a flow chart shows an exemplary method for determining the location and identity of portable device 108, according to an embodiment of the present invention. In step 700, portable device 108 is initialized with an RF base station 510 (FIG. 5). For example, upon initialization of system 500, portable device 108 may be associated with one of the RF base stations 510, as described above. In step 702, portable device 108 is placed in a sleep mode, to conserve power consumption by battery 414, for example, by microcontroller 404 (FIG. 4). In general, there are two types of sleep modes. In a first type of sleep mode, portable device 108 goes to sleep if its motion detector 406 (FIG. 4) is not active. In a second type of sleep mode, referred to with respect to FIG. 7, portable device 108 also sleeps between events and wakes up to receive timing synchronization information.

In step 704, portable device 108 wakes up to receive timing synchronization information, for example, by RF transceiver 408 (FIG. 4) from RF base station 510 (FIG. 5). In step 706, after a time period from the received timing synchronization information, one or more IR base station signals are detected, for example, by IR detector 402 (FIG. 4) controlled by microcontroller 404 (FIG. 4). As described above, each received IR base station signal includes a corresponding BS-ID. In step 708, a device ID associated with portable device 108 and the received BS-ID are transmitted to the associated RF base station 510 (FIG. 5), for example, by RF transceiver 408 via antenna 412 (FIG. 4).

In step 710, it is determined whether portable device 108 is out of a range of the associated RF base station 510 (FIG. 5), for example, if portable device 108 has roamed into a different RF base station area of coverage 502. If it determined that portable device 108 is not out of range of RF base station 510, step 710 proceeds to step 702 and portable device 108 is placed in sleep mode.

If it determined that portable device 108 is out of range, step 710 proceeds to step 712. In step 712, portable device 108 may be associated with another RF base station 510, for example, as described above. Step 712 proceeds to step 702 and portable device 108 is placed in sleep mode until the next synchronization event occurs.

Figure 9:
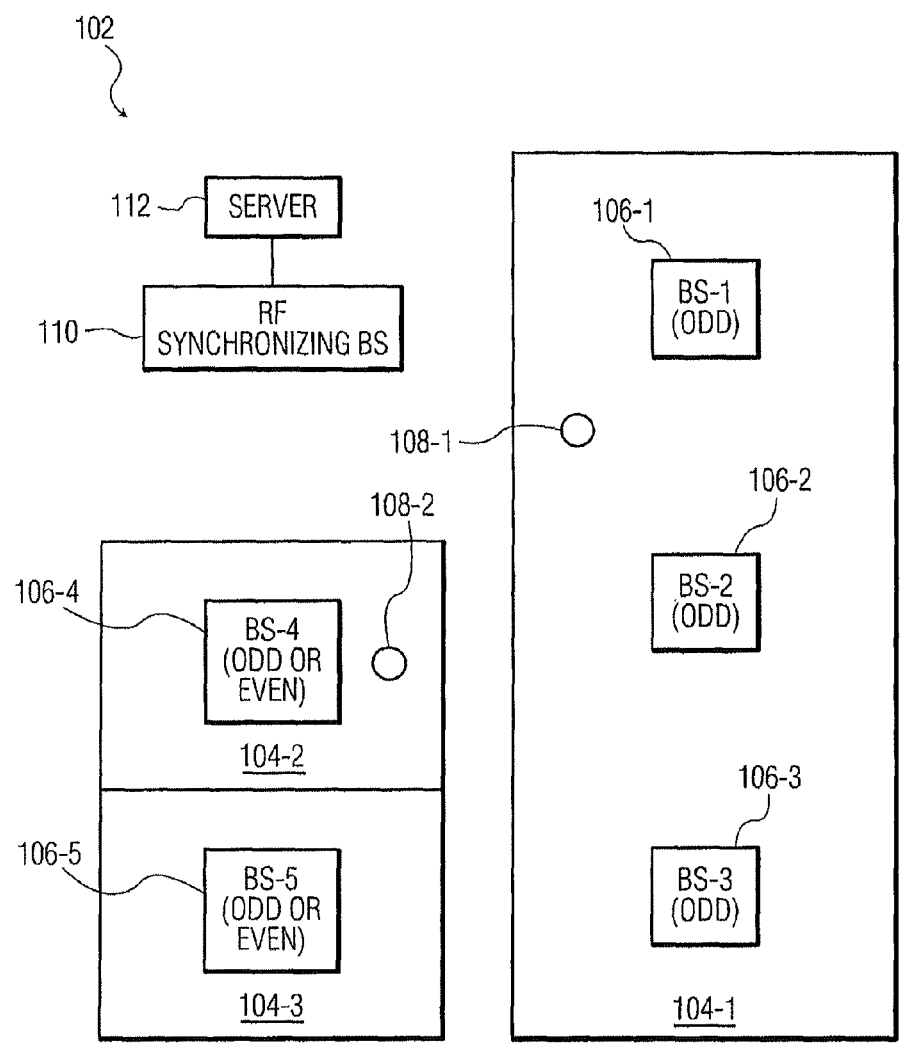
FIG. 9 is a block diagram illustrating an ordering of IR base stations in an enclosure such that the IR base stations transmit at different time periods, according to another embodiment of the present invention.
Figure 10A:
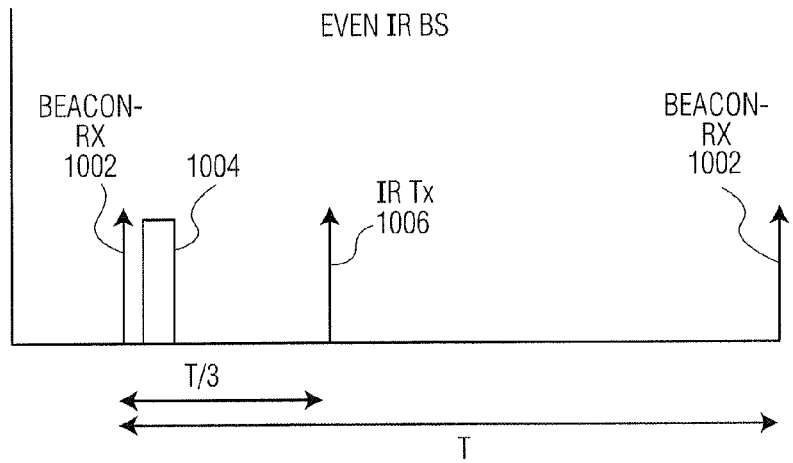
FIGS. 10A, 10B and 10C are diagrams of transmissions versus time of ordered IR base stations and a portable device, according to another embodiment of the present invention.
Figure 10B:
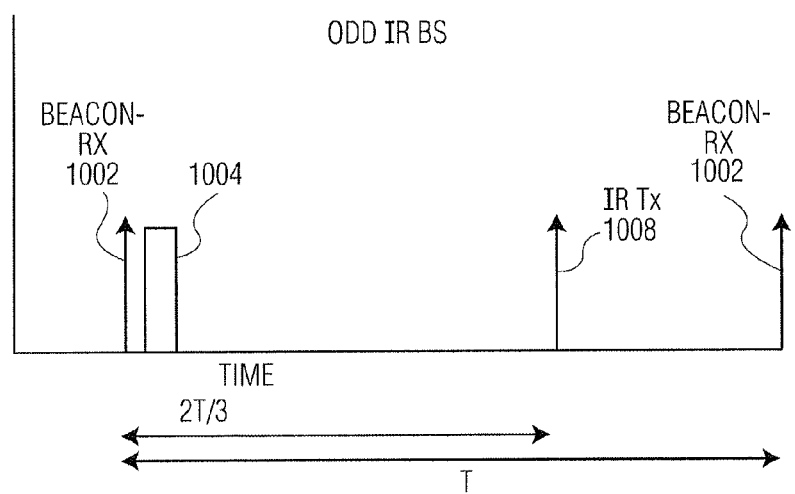
Figure 10C:
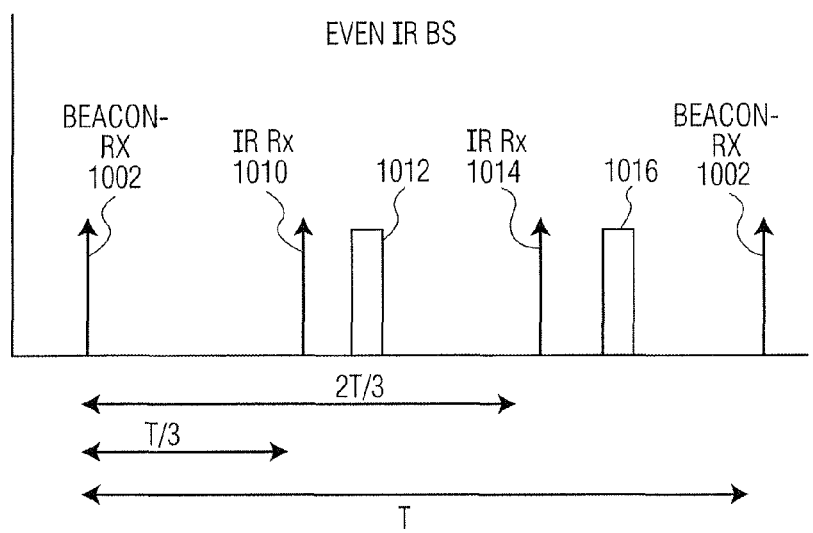

Referring next to FIGS. 9, 10A, 10B and 10C, an ordering of IR base stations 106 to transmit at different time periods is illustrated, according to another embodiment of the present invention. FIG. 9 is a block diagram illustrating an ordering of IR base stations 106 in an enclosure such that IR base stations 106 transmit at different time periods; and FIGS. 10A, 10B and 10C are diagrams of transmissions versus time of ordered IR base stations 106 and portable device 108.

Figure 8A:
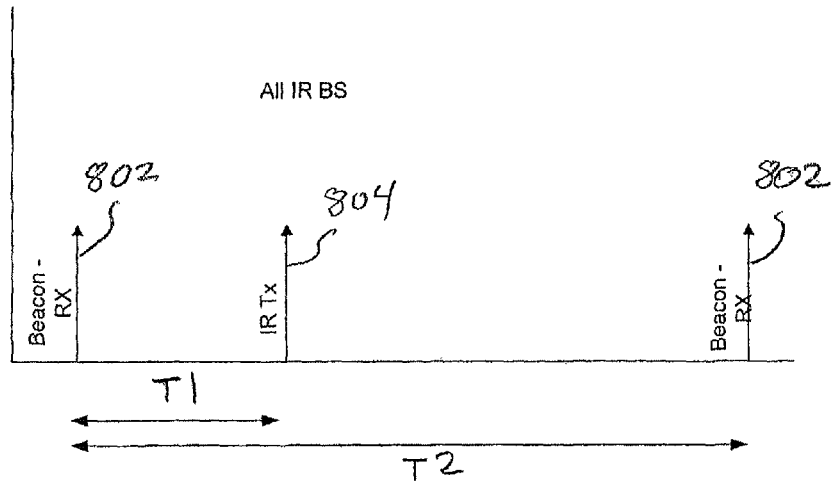
FIGS. 8A and 8B are diagrams of transmissions versus time of an IR base station and a portable device, according to an embodiment of the present invention.
Figure 8B:
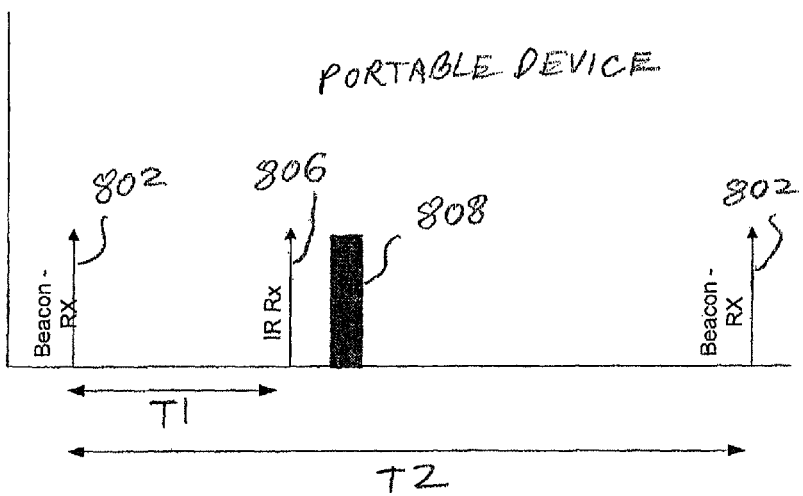

As shown in FIGS. 8A and 8B and described above, multiple IR base stations 106 transmit the respective BS-ID in IR transmission 804 at the same time so that portable devices 108 may activate respective IR detectors 402 (FIG. 4) at the to same time as the IR base station transmission 804. One problem with such a synchronized approach is that two IR base stations 106 may not be provided in a same physical place, because they may interfere with each other. As shown in FIG. 9, IR base stations 106-1, 106-2, 106-3 are each in corridor 104-1. Accordingly, if the IR base stations 106 in corridor 104-1 transmit their respective IR transmissions 804 (FIG. 8A), the IR transmissions 804 may interfere with each other and may create a dead zone in corridor 104-1. Accordingly, in dead zone, portable device 108-1 may not receive either IR transmission from IR base stations 106-1, 106-2, 106-3.

To avoid interference among IR transmissions from IR base stations 106-1, 106-2, 106-3 in corridor 104-1, IR base stations 106 may be ordered, for example, by even and odd ordered IDs. The odd numbered IR base stations may transmits in a different delay as compared to the even numbered IR base stations 106.

Referring to FIGS. 10A and 10B, both even and odd IR base stations 106 may receive beacon 1002 and may transmit a communication 1004 with RF base station 110 (FIG. 9). Even IR base stations 106 may send an IR transmission 1006 after a period of T/3 from the beacon transmission 1002 (FIG. 10A), whereas odd IR base stations 106 may send an IR transmission 1008 after a second period 2T/3 from the beacon transmission 1002 (FIG. 10B). Although periods T/3 and 2T/3 are illustrated, it is understood that these values are exemplary and that any suitable period of time between even and odd ordered IR base station transmissions 1006, 1008 may be used. The advantage of the variable delay between or among IR base stations 106 is in the ability for IR base stations 106 to coexist and function in the same physical open space. This may improve coverage and allows, for example, contiguous coverage of open spaces such as corridors 104-1 (FIG. 9).

Referring to FIG. 10C, portable device 108 receives the beacon transmission 1002. After period T/3, IR detector 402 (FIG. 4) may be controlled to begin receiving an IR signal 1010 from an even IR base station 106 including the BS-ID. Microcontroller 404 may then control RF transceiver 408 (FIG. 4) to transmit an RF signal 1012 including the associated device ID and the received BS-ID. After period 2T/3, IR detector 402 (FIG. 4) may be controlled to begin receiving an IR signal 1014 from an odd IR base station 106 including the BS-ID. Microcontroller 404 may then control RF transceiver 408 (FIG. 4) to transmit an RF signal 1016 including the associated device ID and the received BS-ID. After a period T, another beacon 802 may again be received by portable device 108 (FIG. 9).

It is understood that an allocation of delays may be provided in other suitable ways besides even and odd ordered base stations 110, for example, by assigning a different delay to each IR base station 106 based on its identifying number. It is understood that there may be a tradeoff between a number of delays is versus a power consumption by portable device 108. According to another embodiment, IR base stations 106 may be assigned different IR wavelengths corresponding to the odd and even IR base stations 106. Portable device 108 may include multiple IR detectors for detecting the different IR wavelengths and may select an IR base station 106 having a strongest detected IR signal.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for determining a location and an identity of a portable device, the system comprising:
    a plurality of stationary ultrasonic base stations, each ultrasonic base station including a radio frequency (RF) receiver configured to receive timing synchronization information and an ultrasonic transmitter configured to transmit a corresponding ultrasonic location code in a time period based on the received timing synchronization information, each ultrasonic location code representative of a location of the respective ultrasonic base station;
    a beacon transmitter configured to transmit beacons with the timing synchronization information to the RF receivers in the plurality of stationary ultrasonic base stations; and
    a plurality of portable devices, each portable device configured to detect the ultrasonic location codes from the ultrasonic base stations, and transmit an output signal including a portable device ID representative of the portable device and the detected location code,
    wherein each portable device is synchronized to detect the ultrasonic location code in the time period based on the ultrasonic signals received from the ultrasonic base-stations and the timing synchronization information.

2. The system according to claim 1, wherein the time server periodically provides the timing synchronization information to the beacon transmitter and the beacon transmitter periodically transmits the timing synchronization information.

3. The system according to claim 1, wherein each portable device includes:
    an ultrasonic detector configured to detect the ultrasonic location codes; and
    a radio frequency (RF) transmitter configured to transmit the output signal including the portable device ID and the detected ultrasonic location code.

4. The system according to claim 1, wherein at least the plurality of portable devices or the plurality of ultrasonic base stations are configured to be in a sleep mode when not active.

5. The system according to claim 1, wherein each of the plurality of portable devices includes an ultrasonic receiver configured to receive ultrasonic signals containing the ultrasonic location codes and is configured to derive the timing synchronization information from the received ultrasonic signals.

6. The system according to claim 5, wherein each of the plurality of portable receivers is configured to derive the timing synchronization information from a time of occurrence of a first ultrasonic location code in the received ultrasonic signals.

7. The system according to claim 1, wherein
the beacon transmitter is further configured to transmit the timing synchronization information in response to receiving a request from one of the plurality of portable devices.

8. A system for determining a location and an identity of a portable device, the system comprising:
- a beacon transmitter configured to periodically transmit beacons with timing synchronization information;
- a plurality of stationary ultrasonic base stations, each ultrasonic base station configured to receive the beacons with the timing synchronization information and to transmit a corresponding ultrasonic location code in a time period based on the received timing synchronization information, each ultrasonic location code representative of a location of the respective ultrasonic base station; and
- a plurality of portable devices, each portable device configured to detect the ultrasonic location codes from the ultrasonic base stations and transmit an output signal including a portable device ID representative of the portable device and the detected location code,
- wherein each portable device is synchronized to detect the ultrasonic location code in the time period based on the ultrasonic signals received from the ultrasonic base-stations.

9. A system according to claim 8, wherein multiple ultrasonic base stations of the plurality of stationary ultrasonic base stations concurrently transmit the respective ultrasonic location codes of the multiple ultrasonic base stations.

10. A system according to claim 8, wherein the plurality of ultrasonic base stations transmit the respective ultrasonic location codes periodically in a predetermined order, and different ultrasonic base stations among the plurality of ultrasonic base stations are activated at times corresponding to respectively different portions of the ordered transmission.

11. The system according to claim 8, wherein each of the plurality of portable devices includes an ultrasonic receiver configured to receive ultrasonic signals containing the ultrasonic location codes and is configured to derive the timing synchronization information from the received ultrasonic signals.

12. The system according to claim 11, wherein each of the plurality of portable receivers is configured to derive the timing synchronization information from a time of occurrence of one of the ultrasonic location codes in the received ultrasonic signals.

13. The system according to claim 8, wherein:
the beacon transmitter is further configured to transmit the timing synchronization information in response to receiving the request from one of the plurality of portable devices.

* * * * *